US008963987B2

(12) United States Patent
Byun et al.

(10) Patent No.: US 8,963,987 B2
(45) Date of Patent: Feb. 24, 2015

(54) NON-LINGUISTIC SIGNAL DETECTION AND FEEDBACK

(75) Inventors: Byungki Byun, Atlanta, GA (US);
Philip A. Chou, Bellevue, WA (US);
Mary P. Czerwinski, Kirkland, WA (US); Ashish Kapoor, Kirkland, WA (US); Bongshin Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1154 days.

(21) Appl. No.: 12/789,142

(22) Filed: May 27, 2010

(65) Prior Publication Data

US 2011/0292162 A1    Dec. 1, 2011

(51) Int. Cl.
*H04N 7/14*        (2006.01)
*H04N 7/15*        (2006.01)

(52) U.S. Cl.
CPC . *H04N 7/15* (2013.01); *H04N 7/147* (2013.01)
USPC .................................. 348/14.08; 379/202.01

(58) Field of Classification Search
CPC ......... H04N 7/15; H04N 7/155; H04M 3/567; H04M 3/56; H04L 65/403; H04L 67/22; H04L 12/1827; H04L 47/70
USPC ............. 379/88.1–88.13, 93.21, 158, 202.01, 379/205.01, 102.07, 106.01; 348/14.08–14.1, 211.12; 455/67.7, 455/156.1, 416, 69; 370/260–266
See application file for complete search history.

(56) References Cited

U.S. PATENT DOCUMENTS

| | | | |
|---|---|---|---|
| 5,598,209 A | 1/1997 | Cortjens et al. | |
| 5,999,208 A | 12/1999 | McNerney et al. | |
| 6,132,368 A | 10/2000 | Cooper | |
| 6,608,644 B1 | 8/2003 | Kondo et al. | |
| 6,889,120 B2 | 5/2005 | Jouppi | |
| 6,990,639 B2 | 1/2006 | Wilson | |
| 7,187,764 B2 * | 3/2007 | Ruetschi | 379/202.01 |
| 7,346,654 B1 | 3/2008 | Weiss | |
| 7,454,460 B2 | 11/2008 | Ivashin | |
| 7,626,569 B2 | 12/2009 | Lanier | |
| 7,652,716 B2 | 1/2010 | Qiu et al. | |
| 7,765,045 B2 | 7/2010 | Yoshida et al. | |
| 7,821,382 B2 | 10/2010 | Kameyama | |
| 7,881,702 B2 | 2/2011 | Heyworth et al. | |
| 7,965,859 B2 | 6/2011 | Marks | |
| 8,036,898 B2 | 10/2011 | Sato et al. | |
| 8,184,132 B2 | 5/2012 | Sakamoto et al. | |
| 8,225,220 B2 | 7/2012 | Barbaro Altieri | |
| 8,708,702 B2 * | 4/2014 | Paul | 434/156 |

(Continued)

OTHER PUBLICATIONS

"New technology helps visually impaired to 'see' emotions", retrieved on May 7, 2010 at <<http://www.expertsvar.se/4.fe857aa117caa42683800010.html?prid=13478>>, Expert Answer Press Release, Published Apr. 27, 2010, 3 pages.

(Continued)

*Primary Examiner* — Akelaw Teshale
(74) *Attorney, Agent, or Firm* — Heikki Einola; Judy Yee; Micky Minhas

(57) ABSTRACT

Non-linguistic signal information relating to one or more participants to an interaction may be determined using communication data received from the one or more participants. Feedback can be provided based on the determined non-linguistic signals. The participants may be given an opportunity to opt in to having their non-linguistic signal information collected, and may be provided complete control over how their information is shared or used.

20 Claims, 13 Drawing Sheets

(56) References Cited

U.S. PATENT DOCUMENTS

| | | | |
|---|---|---|---|
| 2002/0109719 A1 | 8/2002 | Hata et al. | |
| 2003/0129956 A1 | 7/2003 | Virolainen | |
| 2003/0163310 A1* | 8/2003 | Caldwell et al. | 704/235 |
| 2004/0013252 A1* | 1/2004 | Craner | 379/142.01 |
| 2005/0228676 A1* | 10/2005 | Ifukube | 704/275 |
| 2005/0257174 A1 | 11/2005 | Wilson | |
| 2005/0267826 A1 | 12/2005 | Levy et al. | |
| 2006/0074684 A1 | 4/2006 | Yoshida et al. | |
| 2006/0126538 A1* | 6/2006 | Krstulich | 370/260 |
| 2007/0139515 A1 | 6/2007 | Du Breuil | |
| 2007/0172805 A1* | 7/2007 | Paul | 434/308 |
| 2007/0285506 A1 | 12/2007 | Schneider | |
| 2008/0062252 A1 | 3/2008 | Kawamura et al. | |
| 2008/0198222 A1 | 8/2008 | Gowda | |
| 2008/0266380 A1 | 10/2008 | Gorzynski et al. | |
| 2010/0186026 A1 | 7/2010 | Lee et al. | |
| 2010/0226487 A1 | 9/2010 | Harder et al. | |
| 2010/0253689 A1* | 10/2010 | Dinicola et al. | 345/467 |
| 2010/0257462 A1* | 10/2010 | Barrett et al. | 715/756 |
| 2010/0321467 A1 | 12/2010 | Goodman | |
| 2011/0002451 A1* | 1/2011 | Moran et al. | 379/88.22 |
| 2011/0096137 A1* | 4/2011 | Baker et al. | 348/14.08 |
| 2011/0169603 A1 | 7/2011 | Fithian et al. | |

OTHER PUBLICATIONS

Caldwell, Wardle, Kocak, Goodwin, "Telepresence Feedback and Input Systems for a Twin Armed Mobile Robot", retrieved on Mar. 30, 2010 at <<http://ieeexplore.ieee.org/stamp/stamp.jsp?arnumber=00540147, IEEE Robotics and Automation Magazine, Sep. 1996, pp. 29-38.

Jouppi, Iyer, Mack, Slayden, Thomas, "A First Generation Mutually-Immersive Mobile Telepresence Surrogate with Automatic Backtracking", retrieved on Mar. 30, 2010 at <<http://www.hpl.hp.com/personal/Norman_Jouppi/icra04.pdf>>, IEEE Conference on Robotics and Automation (ICRA), vol. 2, Apr. 26, 2004, pp. 1670-1675.

Rehman, Shafiq; "Expressing Emotions through Vibration for Perception and Control", Department of Applied Physics and Electronics, Umea University, Sweden, Apr. 2010, 173 Pages.

Stone, "Haptic Feedback: A Potted History, From Telepresence to Virtual Reality", retrieved on Mar. 31, 2010 at <<http://www.dcs.gla.ac.uk/~stephen/workshops/haptic/papers/stone.pdf, Workshop on Haptic HumanComputer Interaction, 2000, pp. 1-7.

Ueberle, Esen, Peer, Unterhinninghofen, Buss, "Haptic Feedback Systems for Virtual Reality and Telepresence Applications", retrieved on Mar. 31, 2010 at <<http://www.lsr.ei.tum.de/fileadmin/publications/HD-Symp_2006_Ueberle.pdf, 2009, pp. 1-9.

Office action for U.S. Appl. No. 12/789,055, mailed on Feb. 25, 2013, Cunnington et al., "Detecting Reactions and Providing Feedback to an Interaction", 20 pages.

Office action for U.S. Appl. No. 12/789,055, mailed on May 13, 2013, Cunnington et al., "Detecting Reactions and Providing Feedback to an Interaction", 28 pages.

* cited by examiner

200

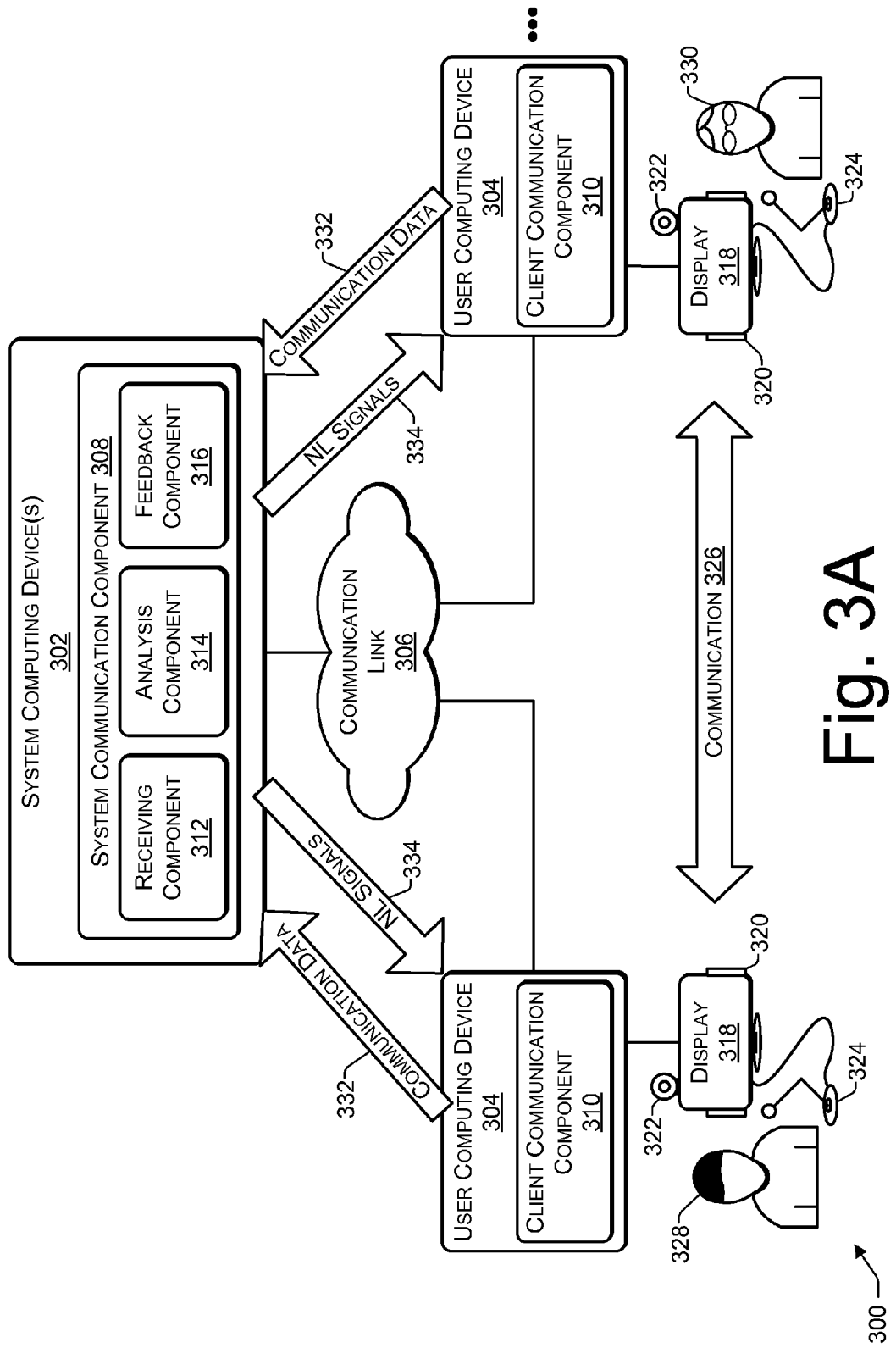

NON-LINGUISTIC SIGNAL DETECTION AND FEEDBACK

BACKGROUND

Animals are able to communicate with each other using non-linguistic signals, such as physical appearance, expressions, movements, actions, vocalizations, etc. Although people have developed languages to communicate, they also continue to use non-linguistic signals as well. For instance, when people interact and communicate in a face-to-face manner, each person naturally provides detectable non-linguistic signals or physical clues that enable other people to determine a response, mood, reaction, emotion or other condition of the person with whom they are communicating. People are able to both consciously and subconsciously interpret these non-linguistic signals or "honest signals" as a measure of the communication, and can adjust their interactions accordingly.

On the other hand, during a telecommunication session, videoconference, or other interaction in which participants do not share physical proximity, the participants may be using computing devices, telepresence systems, handheld devices, smartphones or other communication devices which do not readily or easily expose the participants' reactions. Thus, during a typical telecommunication session, a person may not be able to accurately detect the non-linguistic signals of the other participants. For example, a first participant may be confused, bored, entertained, angry, or the like, but a second participant may have little information or feedback on the actual condition of the first participant. Further, a person may not be entirely aware of the non-linguistic signals that he or she is conveying (or not conveying), and thus, the person may not be communicating as effectively as possible.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein analyze communication data of one or more participants to an interaction to provide feedback regarding non-linguistic signals detected for the one or more participants. For example, feedback may be provided to a participant to whom the non-linguistic signals to pertain, or to one or more other participants. Participants may be invited to opt in to have their non-linguistic signals detected and may be provided with complete control over how their collected information is shared or used.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 3A depicts an example of a system architecture according to some implementations.

DETAILED DESCRIPTION

Reaction Detection and Feedback

Figure 1:
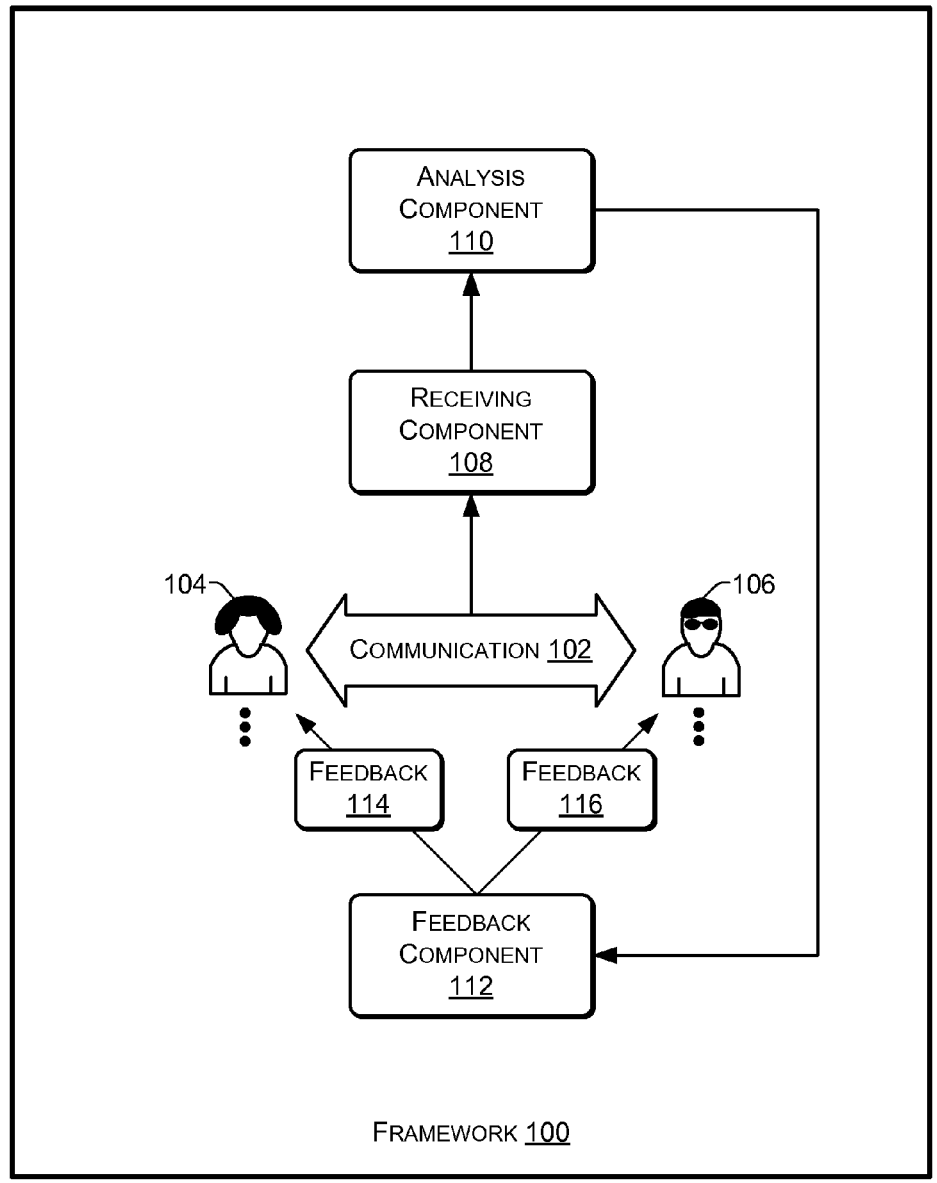
FIG. 1 depicts a block diagram of an example non-linguistic signal detection and feedback framework according to some implementations disclosed herein.

The technologies described herein are generally directed towards detecting non-linguistic signals of one or more participants during an interaction and providing feedback to one or more participants. For example, communication data gathered from the participants during a telecommunication session, such as a videoconference, teleconference or similar communication, may be received, analyzed and made available to provide real-time influence during an ongoing interaction. Additionally, the non-linguistic signal information may be stored and analyzed with non-linguistic signal information collected from multiple other interactions for identifying trends and patterns, such as for understanding social roles and behavior patterns, and for analyzing social dynamics across an organization.

Communication data used for detecting non-linguistic signals can be obtained from audio and video devices already employed when people interact in a telecommunication session, such as a videoconference, teleconference or similar setting. For example, frame-level analysis of certain features of audio and video data can be employed for estimating non-linguistic signals of participants. Further, metadata (such metadata indicating who is talking to whom, and when and where a conversation takes place) is also available in a telecommunication session. Thus, implementations can gather communication information and metadata and use this for determining non-linguistic signals for a participant. Implementations herein may include feeding back visualizations of the determined non-linguistic signals to the meeting participants, such as for altering the participants' behavior on-the-fly to improve the outcome of the meeting relative to the objectives of the meeting.

Some implementations herein may be used in a one-on-one or small group telecommunication session in which each participant participates through a dedicated user computing device Implementations can also apply in larger group meetings that include multiple participants at one or more locations communicating through a single device or multiple telecommunication devices at each location. Feedback including interpretation, quantification, or visualization of a particular participant's non-linguistic signals can be provided to the particular participant, such as for helping the participant modify his or her behavior so that the participant conveys the signals that he or she wishes to convey. Additionally, when consented to by the individual, the feedback information may also be shared with one or more other participants to the communication, such as for helping the receiver better understand or be cognizant of the signals that the participant is sending. The detected non-linguistic signals may also be stored for later analysis and pattern detection. For example, the non-linguistic signals of meeting attendees may be provided to a presenter either during a presentation or after the presentation as feedback to the presenter. Further, in some implementations, the detected non-linguistic signals may be provided anonymously.

Privacy of individuals that choose to participate is protected by implementations herein. Accordingly, for those participants that consent to having their non-linguistic signals detected, communications can be received and analyzed. For those individuals who do not consent, the communications are not obtained or analyzed. Further, those individuals that consent may be provided with complete control over how much of their collected information they choose to share. For example, the collected information may be deleted by the individual, may be stored in a secure location accessible only by the individual, may be stored anonymously with the information of other individuals for use in interaction analytics, such as for detecting trends and patterns, or the like. Additionally, the individual may choose to share a portion of the information with one or more other participants, may choose to share a certain amount of information with some participants and not with other participants, and so forth.

According to some implementations, when certain detected non-linguistic signals occur, feedback may be provided to all the participants or merely to one or more of the individual participants. For example, if the system detects certain reactions, lighting in a room containing one or more participants may be adjusted or changed in color, a particular sound may be generated, or other stimulus or notification may be provided. For instance, if the system detects a reaction from a particular participant, the system may provide feedback to a user interface of the particular participant. For example, a background of the user interface may be changed in color, such as between green for everything is okay, to yellow as a certain threshold is approached and then to red as warning when certain non-linguistic signals are detected. Additional feedback implementations are discussed below.

FIG. 1 illustrates an example of a non-linguistic signal detection and feedback framework 100 for explanation purposes. In the illustrated example, framework 100 is able to detect non-linguistic signals and provide feedback to a communication 102 between two or more individuals, including a first participant 104 and a second participant 106. A receiving component 108 receives communication data, such as frame-level features of audio and video signals produced during the communication 102 from one or both sides of the communication 102. The frame-level features include various signs, indications, or other information extracted from the audio and video signals, as described in additional detail below. As one example, after the participants have provided their consent, the receiving component 108 continually receives frame-level features of audio and video signals of the communication 102 between the two participants. By sending just frame-level features to the receiving component 108, rather than the complete video and/or audio feeds, the privacy of the communication is protected and less communication bandwidth is used. However, in other implementations, the receiving component 108 may receive the entire video and/or audio feeds of one or both participants, and the receiving component 108 may extract the frame-level features from the received video and audio feeds. Other variations will also be apparent in light of the disclosure herein.

The receiving component 108 provides the received audio and video information to an analysis component 110. The analysis component 110 performs analysis on the received audio and/or video information for determining non-linguistic signals of one or more of the participants 104, 106. For example, the analysis component 110 may correlate and synchronize the audio information for a participant with the video information for the participant. The analysis component 110 can consider factors discernable from the video information, such as head motion, facial expressions, eye movement, hand and arm gestures, and so forth. The analysis component 110 can also consider factors discernable from the audio information, such as speaking percentage, syllabic rate, spectral rate, pitch variation, barge-in rate, grant-floor rate, and interruption-suppression rate. The analysis component 110 can then use pattern recognition and statistical models to compute high-level features, such as levels of activity, consistency, and influence that are representative of non-linguistic signals. These non-linguistic signals identified may further be interpreted as being predictive of a social role of a participant (e.g., teaming, leading, active listening, exploring, etc.) or a reaction of a participant. Further, the analysis component can infer various other types of non-linguistic signals such as a level of engagement, a level of vulnerability, a level of confidence, a level of respect, and the like.

The analysis component 110 provides the detected non-linguistic signals to a feedback component 112, which can determine appropriate feedback 114, 116. For example, in some implementations, feedback 114 to participant 104 may include only non-linguistic signals determined for participant 104, while feedback 116 to participant 106 may include only the non-linguistic signals determined for participant 106. Additionally, with participant consent, feedback 114 to participant 104 may also include non-linguistic signal information determined for participant 106, and feedback 116 to participant 106 may also include non-linguistic signal information determined for participant 104. In some implementations, the feedback 114, 116 may include visual estimates of higher-level roles, e.g., actual conclusions regarding a reaction or disposition of a participant, rather than mere estimates of the non-linguistic signals themselves.

In some implementations, feedback 114, 116 may include real-time delivery of the detected non-linguistic signal information to one or more of participants 104, 106. Feedback 114, 116 may also include automatic adjustment of one or more parameters of a user interface of the participants, or automatic adjustment of one or more environmental parameters of rooms or environments in which participants 104, 106 are located, such as adjusting lighting, temperature, sound etc. Additionally, feedback 114, 116 may include analysis information provided at a later point in time to one or more of the participants 104, 106, or to others, such as meeting coordinators. For example, feedback 116 may be provided to a participant at a later point in time for training or coaching purposes, e.g., for improving a presentation technique, improving interviewing skills, adjusting the content of a presentation, and so forth.

Accordingly, the analysis data provided by the analysis component 110 can be stored and made available by the feedback component 112 for immediate or future consumption by the participants. In the case of immediate consumption, a participant may be provided with his or her own data and this can be used by the participant to help the participant change the way in which the participant is perceived by the other participants. As another example, a participant may approach a colleague with captured non-linguistic signals and probe the colleague as to what these signals mean and whether the framework correctly identified the emotions and reactions intended.

Further, individuals are provided with the ability to control how much of their information is revealed to others. For example, a user may select an option before, during, and/or after a meeting to indicate the level of information that the user would like to disclose in the given setting. Accordingly, an individual may create both shared and private data streams, in which a portion of the individual's data can be shared and made available to others (either anonymously or not), while another portion of the data may be retained in private and accessible only to the individual.

Figure 2:
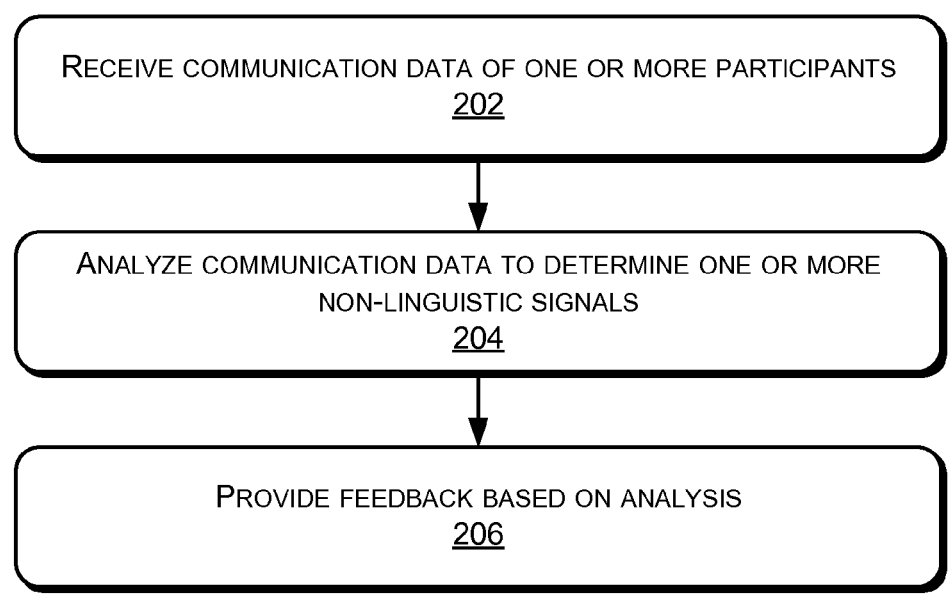
FIG. 2 depicts a flow diagram of an example process for non-linguistic signal detection and feedback according to some implementations.

FIG. 2 illustrates an example of a process 200 for detecting non-linguistic signals and providing feedback according to some implementations herein. In the flow diagram, the operations are summarized in individual blocks. The operations may be performed in hardware, or as processor-executable instructions (software or firmware) that may be executed by one or more processors. Further, the process 200 may, but need not necessarily, be implemented using the framework of FIG. 1.

At block 202, communication data of one or more participants to a communication or other interaction is received. For example, as described above, following participant consent, audio and video feeds from one or more participants to a telecommunication session, such as a videoconference, teleconference or other interaction can be received by a receiving component.

At block 204, the communication data received by the receiving component is analyzed. For example, the video and audio for a participant can be correlated, synchronized and analyzed to determine non-linguistic signals indicative of a reaction, mood or disposition of one or more of the participants. For example, statistical modeling and analysis of a variety of features detected from the audio and video data at a per-frame level may be used to determine non-linguistic signals for a particular participant using the communication data received for the particular participant.

At block 206, feedback is provided based on the analysis of the communication data. For example, feedback may be provided in real time to one or more of the participants. In some cases, the feedback for each individual is provided only to that individual, and the individual is provided with an option as to whether or not to share the information. Thus, when consent has been granted, the other participants also may receive some or all of non-linguistic signal information of a participant. In addition, a user interface or the environment of one or more participants may be automatically adjusted based on the results of the analysis. Additionally, the analysis results may be stored and provided at a later time as feedback to one or more of the participants, and further may be used over the long-term for detecting trends and patterns of behavior, and so forth.

The above framework and process for detecting reactions and providing feedback may be implemented in a number of different environments and situations. While several examples are described below for explanation purposes, the disclosure herein is not limited to the specific examples, and can be extended to additional applications and settings.

Example System Architecture

FIG. 3A illustrates an example architecture of a system 300 according to some implementations. In the illustrated example, system 300 includes at least one system computing device 302 able to receive communications carried out between two or more user computing devices 304 through a communication link 306. User computing devices 304 may be any of desktop computing devices, laptop computing devices, mobile computing devices, hand-held computing devices, smart phones, cell phones, telepresence systems, videoconferencing systems, teleconferencing systems, or other suitable computing and communication devices. In some implementations, user computing devices 304 communicate with each other and system computing device 302 through the communication link 306. Communication link 306 may any of a direct connection, a local area network (LAN), a wide area network (WAN), such as the Internet, a wireless network, mobile communications network, any combination thereof, or other suitable communication network enabling communication between multiple user computing devices 304 and system computing device 302.

System computing device 302 may be a server, mainframe, or other suitable computing device. A system communication component 308 may be implemented on system computing device 302 and may be configured to communicate with client communication components 310 on user computing devices 304. System communication component 308 may include a receiving component 312 for receiving and storing communication data from user computing devices 304. System communication component 308 may further include an analysis component 314 for correlating, synchronizing and analyzing the communication data received from the user computing devices 304. As one example, analysis component can correlate and synchronize the communication data collected for each participant. Analysis component 314 creates analysis data by identifying and combining indicators provided by frame-level features of the communication data collected for a participant to estimate and classify non-linguistics signals of the participant. Further, the analysis component 314 can provide analysis of accumulated information collected over time for identifying trends and patterns in human behavior.

System communication component 308 may further include a feedback component 316 for providing feedback to one or more participants. For instance, the analysis component 314 can provide the analysis data including the determined non-linguistics signals to the feedback component 316. The feedback component 316 can then provide appropriate feedback based on system settings or participant instructions. For example, in some implementations, feedback component 316 provides feedback in real time during an interaction, or at later points in time, to user computing devices 304 to enable participants to view their own non-linguistic signals or those of other participants. In some implementations, feedback component 316 may also apply feedback to adjust the user interfaces of the participants or to adjust an environment of the participants.

User computing devices 304 may include components suitable for facilitating communication by telecommunication, such as videoconference, teleconference, or the like. Thus, user computing device 304 may include a display 318, speakers 320, a camera 322 and a microphone 324. During a communication 326 between two or more participants, including a first participant 328 and second participant 330, client communication components 310 on user computing devices 304 are able to pass communications, such as live audio and video, between the user computing devices 304. In some implementations, system computing device 302 facilitates the communication 326 between the user computing devices 304, such as by acting as a bridge. However, in other implementations, client communication components 310 may carry out the communication 326 independently of system computing device 302. During the communication 326, communication data 332 can be received by receiving component 312 of system computing device 302. For example, for those participants that have consented to having their non-linguistic signals detected, receiving component 312 receives for analysis communication data 332, such as frame-level audio and video data extracted from the audio and video signals of the consenting participants. Further, in some implementations, the client communication component may also detect device usage and activity of a user, such as mouse usage, keyboard activity, desktop usage history, and the like. This activity information may also be provided as part of the communication data 332 to the receiving component 312. In some implementations, the communication data may be stored by the receiving component 312, while in other implementations, the communication data 332 may be retained only temporarily, such as in a memory buffer or other temporary storage. The receiving component 312 provides the received communication data 332 to the analysis component 314 for analysis.

According to some implementations, communication data 332 can include frame-level video and audio features for each participant as raw or low-level communication data. In some implementations, frame-level features extracted from audio may include pitch frequency, total power, spectral distance between two frames, and so forth. Further, frame-level features extracted from video may include head location and size, optical flows over the head location between two consecutive frames, a response to a filterbank over the head location, and the like. These features may be extracted on a regular periodic basis, e.g., every 10-30 milliseconds, although implementations herein are not limited to any particular time period. For example, the audio features might be extracted every 10 ms, while the video features might be extracted every 30 ms, etc.

Client communication components 310 can stream per-frame video and audio features to the system computing device 302. The receiving component 312 is able to match the appropriate streams for the user computing devices 304 that are party to the particular communication 326, and spawn a process for that telecommunication session. The analysis component 314 synchronizes the communication data streams and periodically (e.g., every second) computes mid-level features from the frame-level features, including speaking percentage, syllabic rate, spectral rate, pitch variation, barge-in rate, grant-floor rate, and interruption-suppression rate. For example, the analysis component 314 may use pattern recognition and statistical models to determine the various mid-level features. The analysis component 314 is also able to determine other mid-level features obtained from video data, such as head and body movement, changes in facial expressions, eye movement and eye focal location, and other indicators of non-linguistic signals. These mid-level features are then applied to additional statistical models and pattern recognition for determining one or more non-linguistic signals and/or higher-level roles or reactions which are provided to feedback component 316. Feedback component 316 can then provide this information to one or more participants, depending on sharing permissions granted, and the like.

Figure 3B:
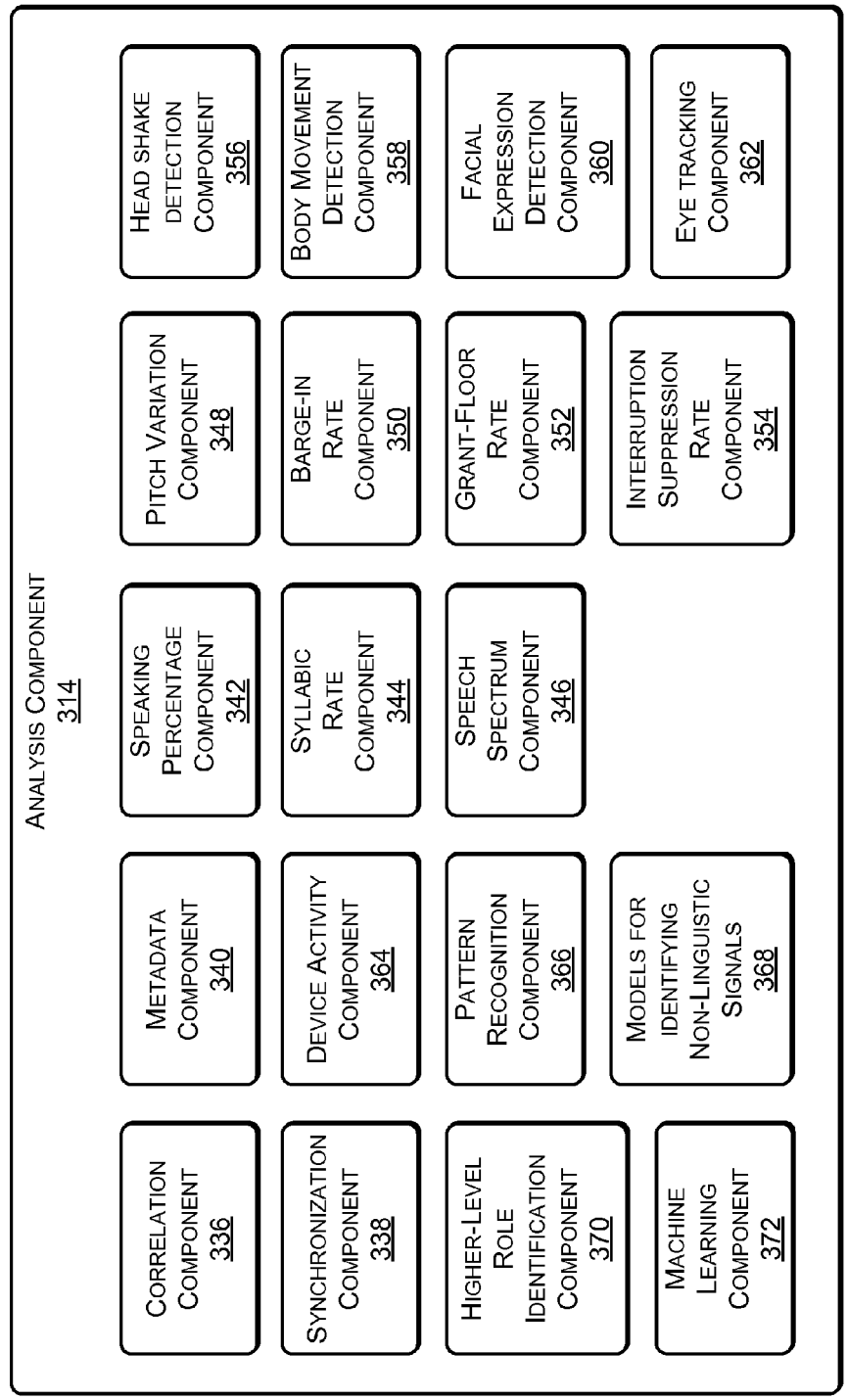
FIG. 3B depicts an example of an analysis component of FIG. 3A according to some implementations.

FIG. 3B illustrates an example of analysis component 314 according to some implementations herein. Analysis component 314 may include a correlation component 336 for correlating the received audio and video data with an identity of a particular participant. A synchronization component 338 synchronizes the audio data received with the video data received so that the two are able to be analyzed together, such as for considering certain motions or facial expressions in conjunction with certain speech patterns or expressions, etc. The synchronization component 338 also synchronizes the communication data of a first participant with the communication data of one or more other participants, such as for determining a reaction of one participant to the speech or actions of another participant, etc. A metadata component 340 provides metadata relevant to the participant, such as to whom the participant is speaking, when and where the conversation is taking place, and the like.

With respect to processing the audio data, a speaking percentage component 342 determines a speaking percentage for the participant. The speaking percentage represents the amount of time that each participant spends speaking in comparison with the total amount time elapsed during the communication. A syllabic rate component 344 determines a syllabic rate for the participant. The syllabic rate represents how many syllables per second a participant is delivering. For example, speaking quickly can sometimes indicate certain non-linguistic signals, such as interest, excitement, or anger. A speech spectrum component 346 monitors the speech spectrum of the participant. The speech spectral rate can indicate a change in speech resonance and quality. Additionally, a pitch variation component 348 monitors the pitch of the participant's speech, for detecting and tracking any changes in speech pitch of the participant. A barge-in rate component 350 monitors barge-in rate. The barge-in rate represents how often a participant interrupts or starts talking over another participant. Further, a grant-floor rate component 352 monitors how often a participant stops talking to yield the floor to other participants. Finally, an interruption suppression rate component 354 tracks how often a participant resists an attempt by other participants to interrupt or barge in while the participant is speaking Furthermore, with respect to processing the video data, a headshake detection component 356 can identify head movement by a participant. For example, head movement such as headshaking or nodding can be detected and classified using pattern recognition and statistical modeling techniques, such as by applying one or more hidden Markov models trained using a collection of training data, or the like. Additionally, a body movement detection component 358 may also be provided for detecting and classifying certain body movements of a participant in a similar manner. Further, a facial expression detection component 360 can be implemented to detect and interpret changes in facial expressions of a participant. Changes in facial expression may also be modeled, such as by using hidden Markov models and other statistical modeling techniques and pattern recognition for detecting and classifying changes in facial expressions. In addition, an eye tracking component 362 may also use pattern recognition and statistical modeling for tracking the movement of a participant's eyes, such as for determining and classifying a focal location, monitoring pupil dilation, blink rate, or like. Other mid-level information indicative of non-linguistic signals may also be obtained from the audio and video data, with the foregoing being mere examples.

In addition, a device activity component 364 may be included for identifying user activity on the user computing device 304 that may be indicative of non-linguistic signals. Such activity may include mouse movement, keyboard activity, desktop history, and the like. Further, a pattern recognition component 366 may be used by or incorporated into any of the other mid-level feature components 342-364 or high-level feature components 368, 370, discussed below, for carrying out pattern recognition during determination of the various features.

From the mid-level features, the analysis component 314 is able to compute high-level features, such as levels of activity, consistency, and influence, which are representative of non-linguistic signals. One or more statistical models 368 in conjunction with pattern recognition can be used by the analysis component 314 for identifying non-linguistic signals as high-level features determined from the mid-level features. For example, the high-level features may be determined as a non-linear function of an affine combination of the mid-level features, whose coefficients can be trained using a machine learning algorithm. The high-level features, as estimates of the fundamental non-linguistic signals 334, may be provided back to the user computing devices 304 along with other relevant information, such as speaking percentage. Examples of non-linguistic signals people exchange during communications include the level of engagement, the level of vulnerability, the level of confidence, the level of respect, etc. These non-linguistic signals can be estimated from the high-level features as activity level, i.e., how engaged the participants are in the communication; consistency level, i.e., how focused or determined the participants are; and influence, i.e., how much the participants influence or control the communication, defer to others etc.

The user computing devices 304 may present the estimates of non-linguistic signals 334 to the participants in a variety of formats and interfaces, as will be discussed additionally below. For example, the non-linguistic signals 334 may be presented as time-varying visualizations along with a history for each high-level feature for the particular session. As mentioned previously, each participant may be presented with estimates of their own non-linguistic signals, and when consented to by the other participants, with the estimates of the non-linguistic signals detected from the other participants. Furthermore, since the non-linguistic signals are predictive of social roles of the participants during the communication (e.g., teaming, leading, active listening, exploring), in some implementations, a higher-level role identification component 370 may determine estimates of such higher-level social roles. These determined higher-level roles may be provided with the estimates of the non-linguistic signals 334, or may be provided in place of the estimates of the non-linguistic signals themselves.

Further, in some implementations, analysis component 314 may also include a machine learning component 372. Machine learning component may present a participant with one or more inquiries or questions provided in a user interface for determining the accuracy of any non-linguistic signals interpreted for the participant. The participant may choose whether or not to respond to the questions and may provide the responses to the machine learning component 372. Depending on the responses of the participant, the machine learning component may then refine at least one of the pattern recognition component 366, the statistical models for identifying non-linguistic signals 368, the higher-level role identification component 370, or the other components 336-364 of the analysis component 314 that rely of the accuracy of statistical models and pattern recognition.

While the foregoing sets forth an example of an architecture of a system 300 for implementing the non-linguistic signal detection and feedback herein, this is merely one example of a possible system, and implementations herein are not limited to any particular system configuration. For example, any or all of receiving component 312, analysis component 314 and feedback component 316 may be implemented in separate system computer devices.

Furthermore, according to some implementations, the receiving component 312, analysis component 314 and feedback component 316 may be implemented in one or more of the user computing devices 304. Under these implementations, the system computing device 302 is not employed. Instead, one or more of the user computing devices 304 can detect the non-linguistic signals of the participant, and/or can detect the non-linguistic signals of the other participants to the interaction. For example, each user computing device 304 may be configured to detect the non-linguistic signals of the particular participant that is using that particular user computing device and, under the direction of the particular participant, may share some or all of the non-linguistic signals for that particular participant with the other participants. In other implementations, with proper privacy controls, one of the user computing devices 304 may determine non-linguistic signals for all the participants. Other variations will also be apparent in light of the disclosure herein. Thus, the implementations disclosed herein may be deployed in any suitable system or environment in which it is desirable to determine non-linguistic signals.

Example User Interface

Figure 4A:
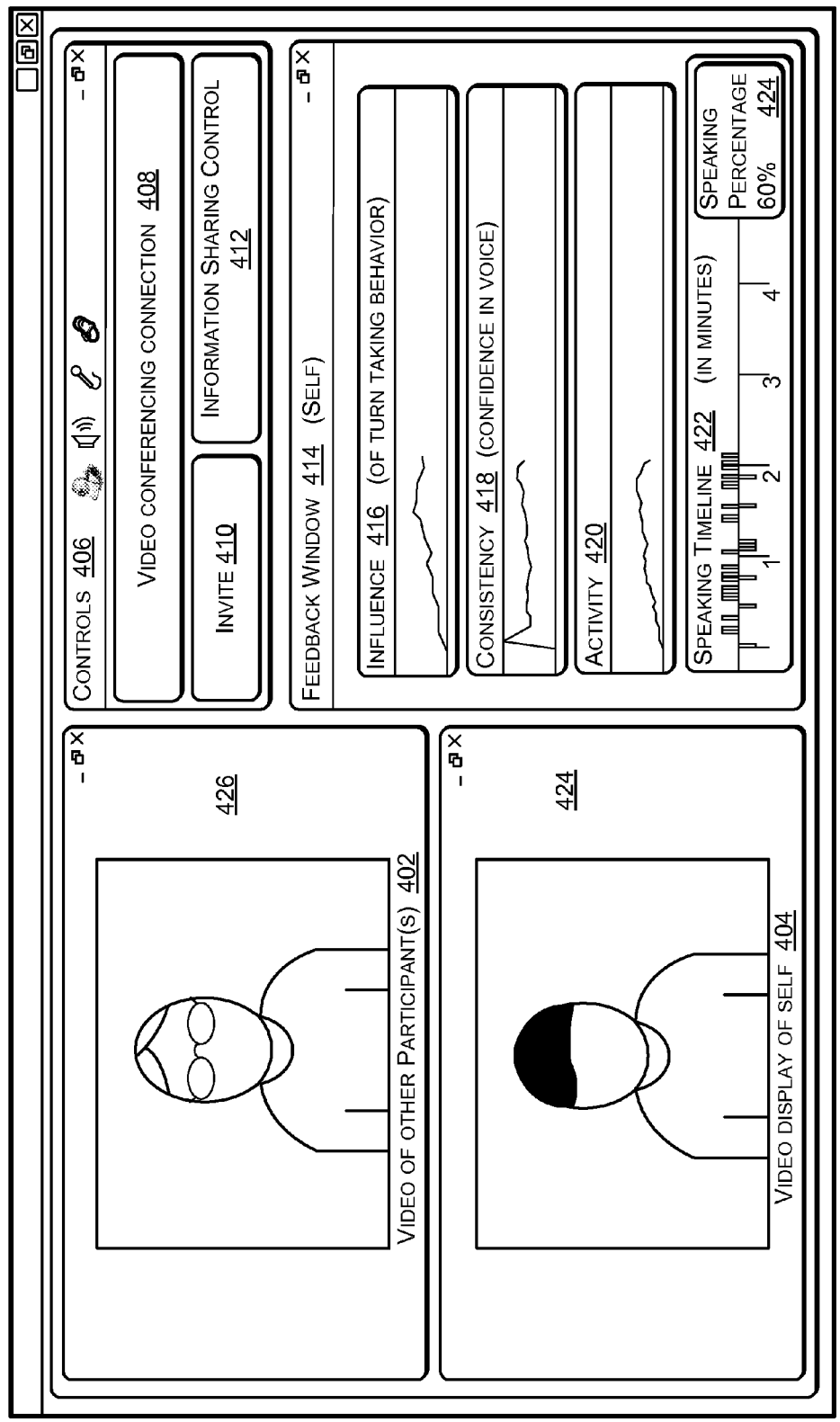
FIGS. 4A-4B depict examples of user interfaces according to some implementations.

FIG. 4A illustrates an example of a user interface 400 according to some implementations herein. For instance, the user interface 400 may be presented on the display 318 of a user computing device 304 of a participant during a telecommunication session or other interaction. In the illustrated example, user interface 400 typically includes a video display 402 of one or more other participants, as well as a video display 404 of the participant himself or herself User interface 400 may also include controls 406 such as for controlling camera parameters, sound parameters, microphone parameters, and calling parameters. User interface 400 may further include a video conferencing connection button 408 for opening an interface to initiate a video conference, an invite button 410 for opening an interface to connect other participants to the video conference, and an information sharing control button 412, that can be used to open an interface to control whether or not the non-linguistic signals are detected, and to control sharing of the participant's non-linguistic signals with the other participants and/or the system.

User interface 400 may also include a feedback window 414 for displaying feedback, such as the non-linguistic signals detected for the participant or for the other participants in real time or near real time. In some implementations, this information can be used by the participant for adjusting his or her behavior during the interaction to thereby improve the effectiveness of the communication. In the illustrated example, some estimated non-linguistic signals determined for the participant are displayed in the feedback window 414. These include high-level non-linguistic signals such as influence 416, consistency 418, activity 420. For example, influence 416 may provide an indication of how much influence the participant has on the course of the interaction, such as what portion of the interaction is influenced by the participant and whether the participant allows others participants to have a turn in speaking their part. Consistency 418 provides an indication of the confidence of the particular participant during speaking and interacting with the other participants. Activity 420 provides indication as to how actively the participant is taking part in the interaction. For example, a participant who is very animated or moving a lot may be perceived to be fairly active, and engaged in the conversation. Furthermore, a speaking timeline 422 may be included depicting which party spoke and for how long to provide perspective as to the history of the non-linguistic signals. Speaking timeline 422 may also include a calculation of overall speaking percentage 424 of the participant.

When one or more of the other participants has consented to having their non-linguistic signals shared with the participant, a similar feedback window may be displayed for those other participants. For example, this may provide the participant with information as to how the other participants are reacting to the interaction, and may possibly influence the behavior of the participant during the interaction for improving communication. In addition, or alternatively, the feedback window may display other non-linguistic signal information regarding the participant or the other participants, such as whether the participant and/or the other participants are teaming, leading, actively listening, exploring, not participating, distracted, or the like. Additionally, the non-linguistic signals from multiple participants may be aggregated and averaged for determining an overall reaction or disposition of the multiple participants.

Furthermore, user interface 400 may provide a more general indication to the participant regarding the participants' non-linguistics signals. For example, a background 424 of the participant's user interface 400, such as at the video display 404, may change color when particular non-linguistic signals are detected for the participant. For example, if the participant is overly influencing the conversation and not giving others a chance to talk the background may turn from green to red, or the like. Similarly, a background 426 of the video display 402 of other participants may similarly have its color adjusted or provide other indications of certain non-linguistic signals of the other participant to the participant. Additionally, feedback to participants, either through the user interface 400 or otherwise, may be configured to control aspects of the participant's environment such as brightness or color of ambient lighting in the room, room temperature, or other aspects in response to the detection of certain non-linguistic signals.

Figure 4B:
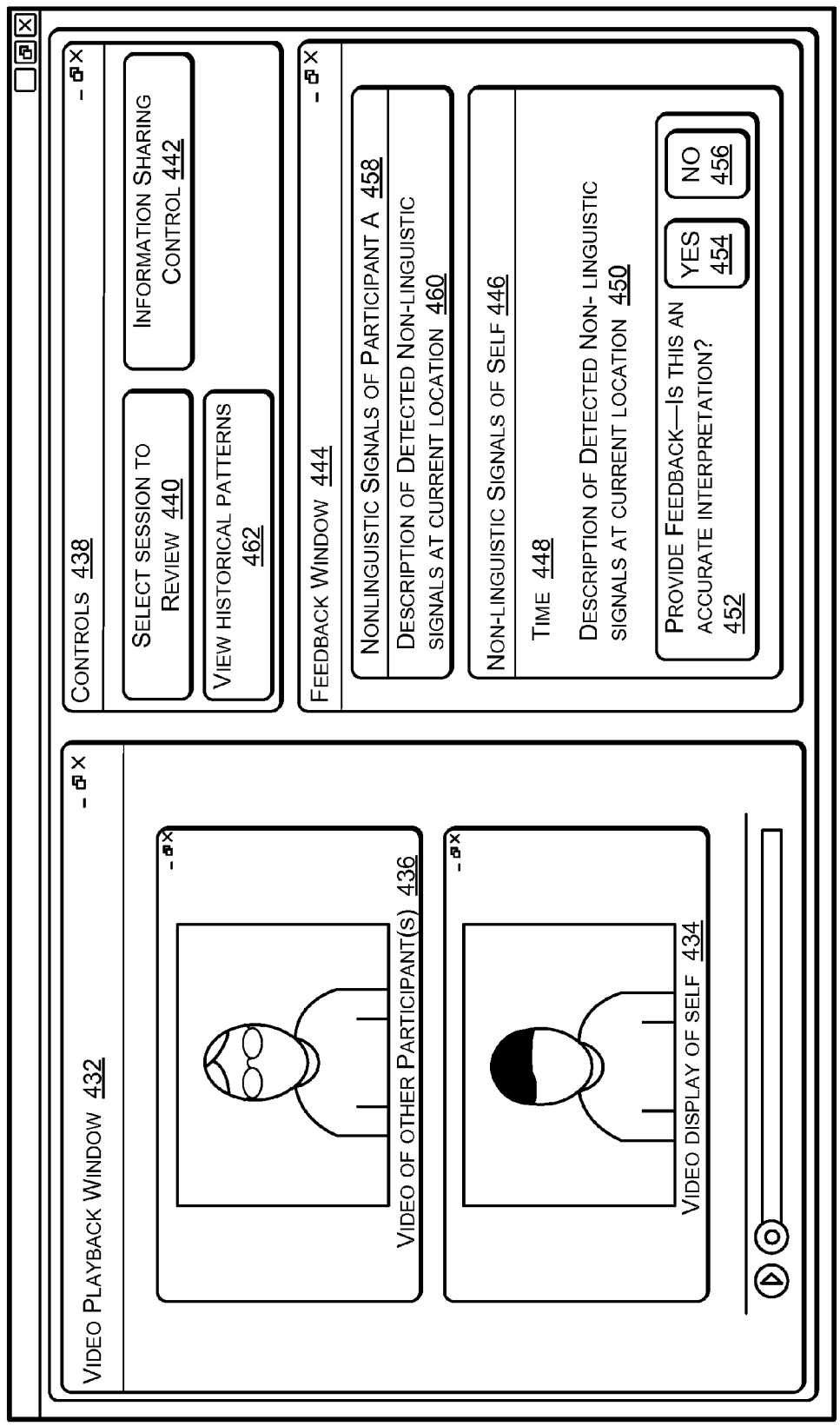

The feedback information provided by feedback window 414 or other feedback may also be provided to the participant following the interaction. For example, a participant might want to see how he or she appeared or responded during the interaction, such as for training purposes, improving interview skills, or the like. FIG. 4B illustrates an example of a user interface 430 that may be used by a participant following an interaction according to some implementations. User interface 430 includes a video playback window 432 to enable a user to view a selected telecommunication session for review. For example, video playback window 432 may be used to play back video and audio of the particular participant, i.e., video display of self 434 and of one or more other participants, i.e., video of other participant(s) 436. Controls 438 may be included, such as a session selection control 440 for selecting a telecommunication session to be reviewed, and an information sharing control 442 for controlling how the user's non-linguistic signals are shared with others. For example, the user may wish to review his or her detected non-linguistic signal before deciding whether to share them with others.

Interface 430 may also include a feedback window 444 that may include a window 446 of the user's non-linguist signals (self). For example, the window 446 may include a time 448 corresponding to the playback of the video and a description of any detected non-linguistic signals 450 at that point in time during the session playback. Additionally, the user interface 430 may include a provision for obtaining feedback from the user, such as for asking the user whether the inferred non-linguistic signals are accurate. This information may be used for machine learning purposes, such as for modifying, improving or otherwise refining the statistical models and pattern recognition component used for determining the non-linguistic signals. Thus, a feedback window 452 may be displayed and can include a "yes" button 454 and a "no" button 456 for providing feedback. Alternatively, in other implementations, more detailed feedback may be requested, as is described additionally below. Further, if the other participant(s) (e.g., participant A) have consented to sharing their detected non-linguistic signals, a window 458 displaying the non-linguistic signals the other participant(s) may also be provided. Window 458 may include a description 460 of the detected non-linguistic signals for the other participant(s) at the corresponding point in time. Other variations are also possible, with the foregoing being just one example for discussion purposes.

User interface 430 may also provide historical feedback on the non-linguistic signals of the participant or other participants accumulated over time from multiple interactions. This information can include analysis and identification of any trends or patterns evidenced by the accumulated information. For example, a historical pattern selection button 456 may be included to enable the user to view and analyze historical patterns and other analytic information.

Additionally, while the user interfaces 400, 430 have been described in the context of a telecommunication session, other implementations are not limited to this context and may be applied in environments such as an audio conference, live meeting or other suitable interaction enabling the collection of audio and/or video data attributable to a particular participant. For example, when a particular participant does not have access to a computing device during the interaction, the participant can still receive feedback on the non-linguistic signals at a later point in time, such as through interface 430, or as is described additionally below.

Example Meeting Room System

Figure 5:
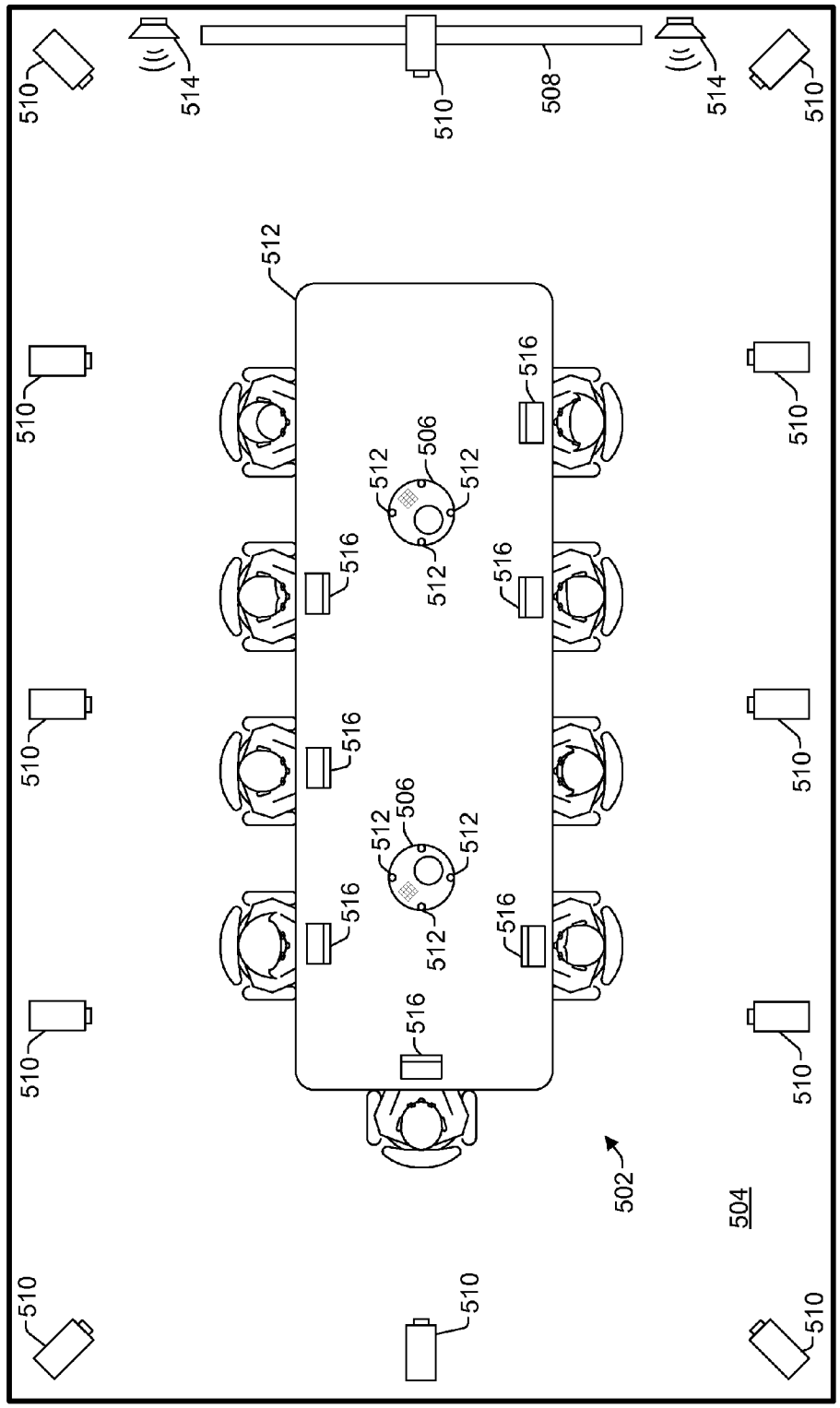
FIG. 5 depicts an example of a meeting room system according to some implementations.

FIG. 5 depicts an example of a meeting room setting for a system 500 according to some implementations herein. Many components of system 500 may correspond to similar components of system 300 described above. For example, a plurality of participants 502 may be present in a meeting room 504 during the meeting, and the meeting room may also include the ability for teleconference or video conference communication with a plurality of additional remote participants (not shown in FIG. 5). For instance, a videoconferencing system 506 may be provided including a display 508 for viewing the remote participants, at least one video camera 510 for providing video to the remote participants, microphones 512 for capturing speech of the participants 502, and speakers 514 for delivering sound to the participants 502. Thus, in some implementations, the videoconferencing system 506 corresponds to the user computing device 304 described above for delivering communication data of the participants to the system computing device 302 (not shown in FIG. 5). Further, the remote participants may be located in a room having a system 500 similar to that of FIG. 5, or may be using other communication devices, such as user computing devices 304 described above.

Depending on the number of participants 502 to be accommodated, the system 500 may be configured with a plurality of video cameras 510 and a plurality of microphones 512. Further, in some implementations, one or more the participants 502 can have user computing devices 516, corresponding to user computing devices 304 described above, that communicate with and participate in the system 500. For example, user computing devices 516 can identify a particular participant that is speaking through that the computing device to ensure that the video and audio feed from that participant is correlated to that participant. In addition, or alternatively, the multiple microphones 512 and video cameras 514 can be used to determine which participant is currently speaking for properly attributing the audio feed and video feed to that participant. For example, locations of the microphones, e.g., the gain on a particular microphone 512 in comparison with that of other microphones 512, may be used to determine a location of a speaker. Furthermore, voice recognition can be used to identify particular participants. Additionally, assigned seating or facial recognition using video cameras 510 may be used for identifying participants for providing video data on each consenting participant.

As an example, the participants 502 are invited to consent to having their non-linguistic signals detected. Those participants 502 who do not consent will not have their non-linguistic signals detected. For example, user computing devices 516 may be used to request consent. If not all participants have user computing devices 516, assigned seating, facial recognition, or other techniques may be used to determine which participants have consented. Further, consent may be requested prior to the meeting, or particular participants may have provided the system 500 a standing instruction to opt in or opt out.

While the meeting is conducted, the non-linguistic signals of the participants who have consented, i.e., both local participants 502 and the remote participants, may be detected by the system 500 in the manner described above. For instance, the video and audio feeds from each participant can be received by the system computing device 302 (not shown in FIG. 5) which can interpret the participant's non-linguistic signals and provide feedback to one or more of the participants, as described above. In some implementations, non-linguistic signals and other feedback may be provided only to the participant to whom the feedback pertains. In other implementations, the participants may choose to share their information, either anonymously or openly.

Example Meeting User Interface

Figure 6:
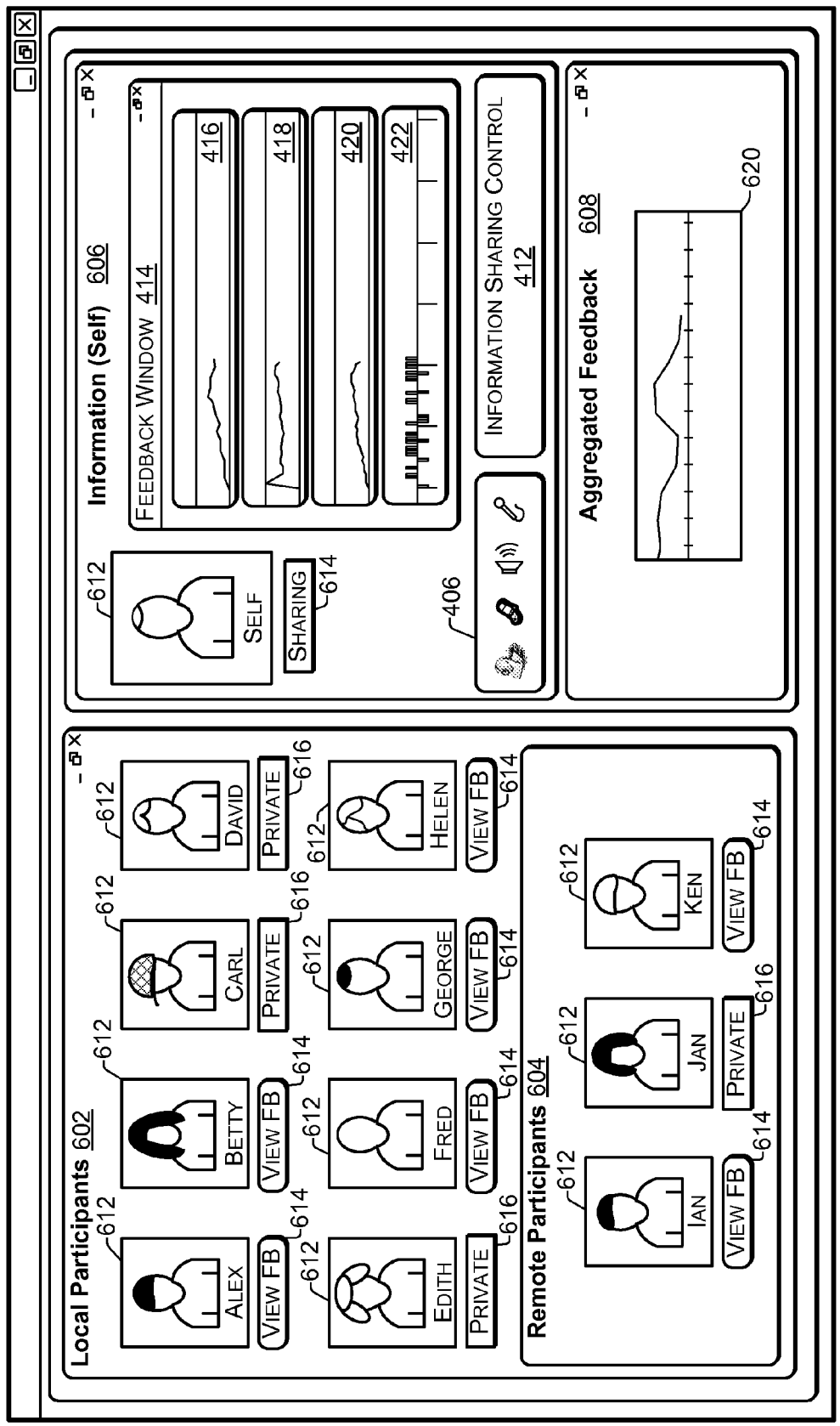
FIG. 6 depicts an example of a meeting user interface according to some implementations.

FIG. 6 illustrates an example of a user interface 600 that may be implemented according to the example of FIG. 5, such as for display on the user computing devices 516 of individual participants. As illustrated, user interface 600 includes a window showing local participants 602 and a window showing remote participants 604. User interface 600 may also include information on the particular user of the user interface 600 as information on self 606. User interface 600 may further include aggregated feedback 608 or other feedback information, such as non-linguistic signals estimated for one or more of the other participants.

For each local and remote participant, user interface 600 may display an image and/or name 612 of the participant, which may include a live video image. For those participants who have consented to sharing their reaction information, user interface 600 may also display in conjunction with the image and/or name 612 a feedback button 614 to view the feedback and non-linguistic signals for that participant. In some cases, the participants may choose not to share their non-linguistic signal information, or may have chosen not to consent to having their non-linguistic signals detected, and in these cases the user interface 600 may show that the information is private 616.

The information on self 606 may include an interface similar to user interface 400 described above, and may include controls 406, information sharing control button 412, and a feedback window 414 including representations of non-linguistic signals 416, 418, 420 and the speaking timeline 422. Information on self 606 may also include a current sharing status indicator 614. For example, should the participant wish to change his or her sharing status, the participant may select the information sharing control button 412 to access a mechanism to enable the participant to control how much of his or her information is shared with others attending the meeting and or retained in data storage. As mentioned above, implementations herein may enable the participants to have complete control over their own personal information, may enable participants to decide how much information to share with others, may maintain participants' information in an anonymous manner, or the like.

The aggregated feedback 608 may include an indication of the participants' overall reactions or dispositions 620 determined from the detected non-linguistic signals for the participants to the meeting. For instance, the non-linguistic signals of all the participants may be aggregated and averaged to give the participants an indication of the current level of participant interest or engagement, etc. For example, certain detected non-linguistic signals may be interpreted as demonstrating that a participant is not interested (e.g., bored, distracted etc.), while other detected non-linguistic signals may be interpreted as demonstrating that the participant is interested (e.g., excited, engaged, etc.). Thus, when the participants are shown by the aggregated feedback 608 to be disinterested in the current topic of discussion, a meeting moderator or the participants themselves may decide to change the topic or carry out other actions such as controlling the environment to affect the participants' dispositions. Additionally, the system may automatically adjust the environment of room 504 and/or the environment of the remote participants in response to certain detected non-linguistic signals, such as by changing lighting, temperature, etc. Furthermore, a modified form of the user interface 600 may be displayed on the videoconferencing system display 508 for viewing by all the participants in room 504. For example, in these implementations, the personal information on self 606 for particular participants may not be displayed.

System Computing Device

Figure 7:
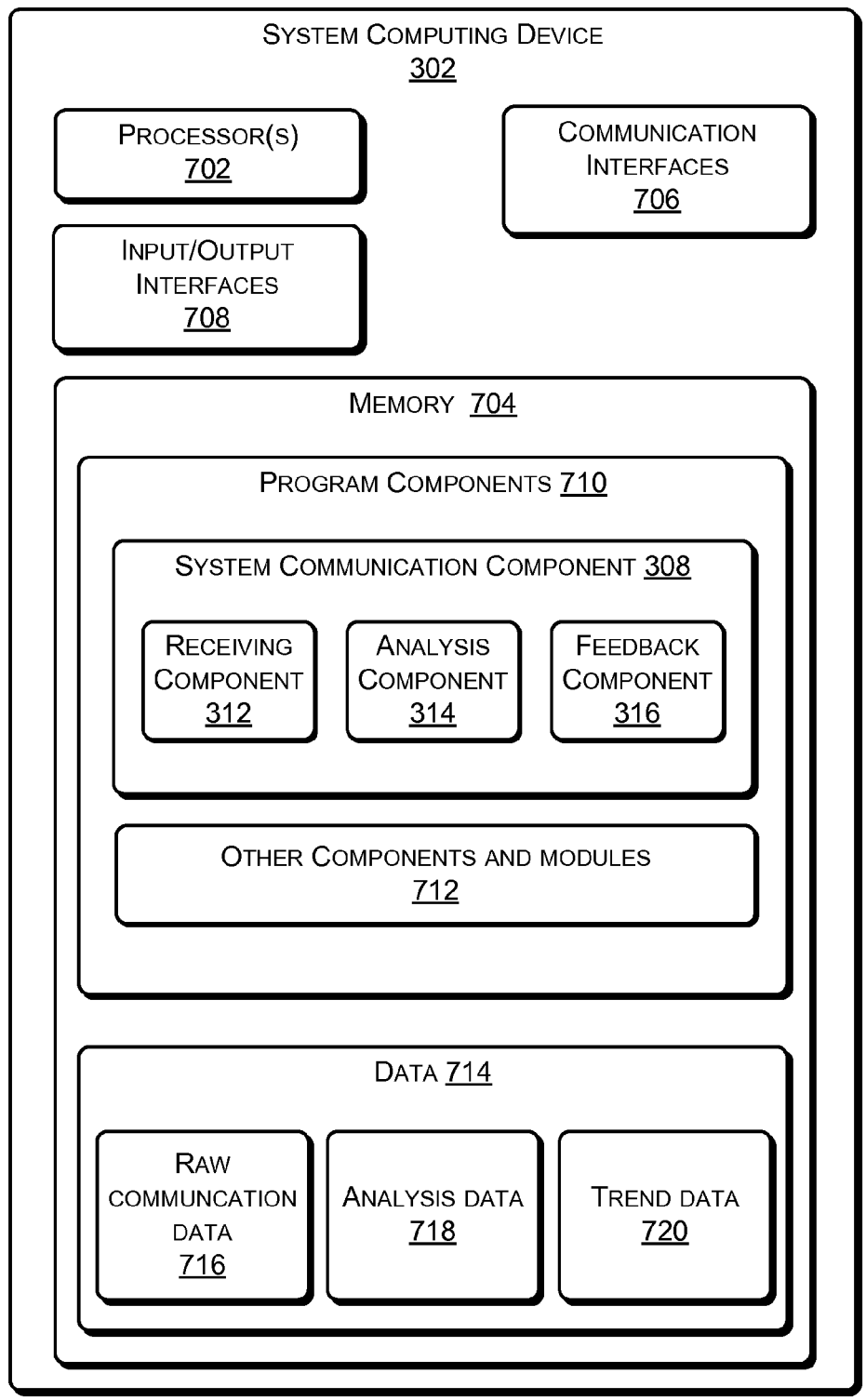
FIG. 7 depicts an example of a system computing device according to some implementations.

FIG. 7 illustrates an example of the system computing device 302 that can be used to implement components and modules for the non-linguistic signal detection and feedback herein. In the illustrated example, system computing device 302 includes at least one processor 702 communicatively coupled to a memory 704, one or more communication interfaces 706, and one or more input/output interfaces 708. The processor 702 can be a single processing unit or a number of processing units, all of which may include multiple computing units or multiple cores. The processor 702 may be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704 or other computer-readable media.

The memory 704 can include any computer-readable storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks (e.g., CD, DVD), storage arrays, storage area networks, network attached storage, or the like, or any combination thereof The memory 704 stores computer-readable processor-executable program instructions as computer program code that can be executed by the processor 702 as a particular machine programmed for carrying out the processes and functions described according to the implementations herein.

The communication interfaces 706 facilitate communication between the system computing device 302 and the user computing devices 304. The communication interfaces 706 can enable communications within a wide variety of networks and protocol types, including wired networks (e.g., LAN, cable, etc.) and wireless networks (e.g., WLAN, cellular, satellite, etc.), the Internet and the like, any of which may correspond to the communication link 306. Communication interfaces 706 can also provide communication with external storage (not shown), such as a storage array, network attached storage, storage area network, etc., for storing user data, raw communication data, or the like.

Memory 704 includes a plurality of program components 710 stored therein and executable by processor 702 for carrying out implementations herein. Program components 710 include the system communication component 308. System communication component 308 includes the receiving component 312, the analysis component 314, and the feedback component 316, as discussed above. Memory 704 may also include a number of other components and modules 712, such as an operating system, drivers, or the like.

Memory 704 also includes data 714 that may include raw communication data 716. As described herein, receiving component 312 may be executed by processor 702 to collect raw communication data 716 from the communication or interaction between the participants. Analysis component 314 correlates and analyzes the collected communication data to generate non-linguistic signal information for participants as analysis data 718. Analysis component 314 may also apply user data collected over time to create cumulative pattern or trend data 720. Further, while an example implementation of a system computing device architecture has been described, it will be appreciated that other implementations are not limited to the particular architecture described herein. For example, one or more of receiving component 312, analysis component 314 and/or feedback component 316 might be implemented on one or more separate computing devices, or in the user computing devices 304. Other variations will also be apparent to those of skill in the art in light of the disclosure herein.

User Computing Device

Figure 8:
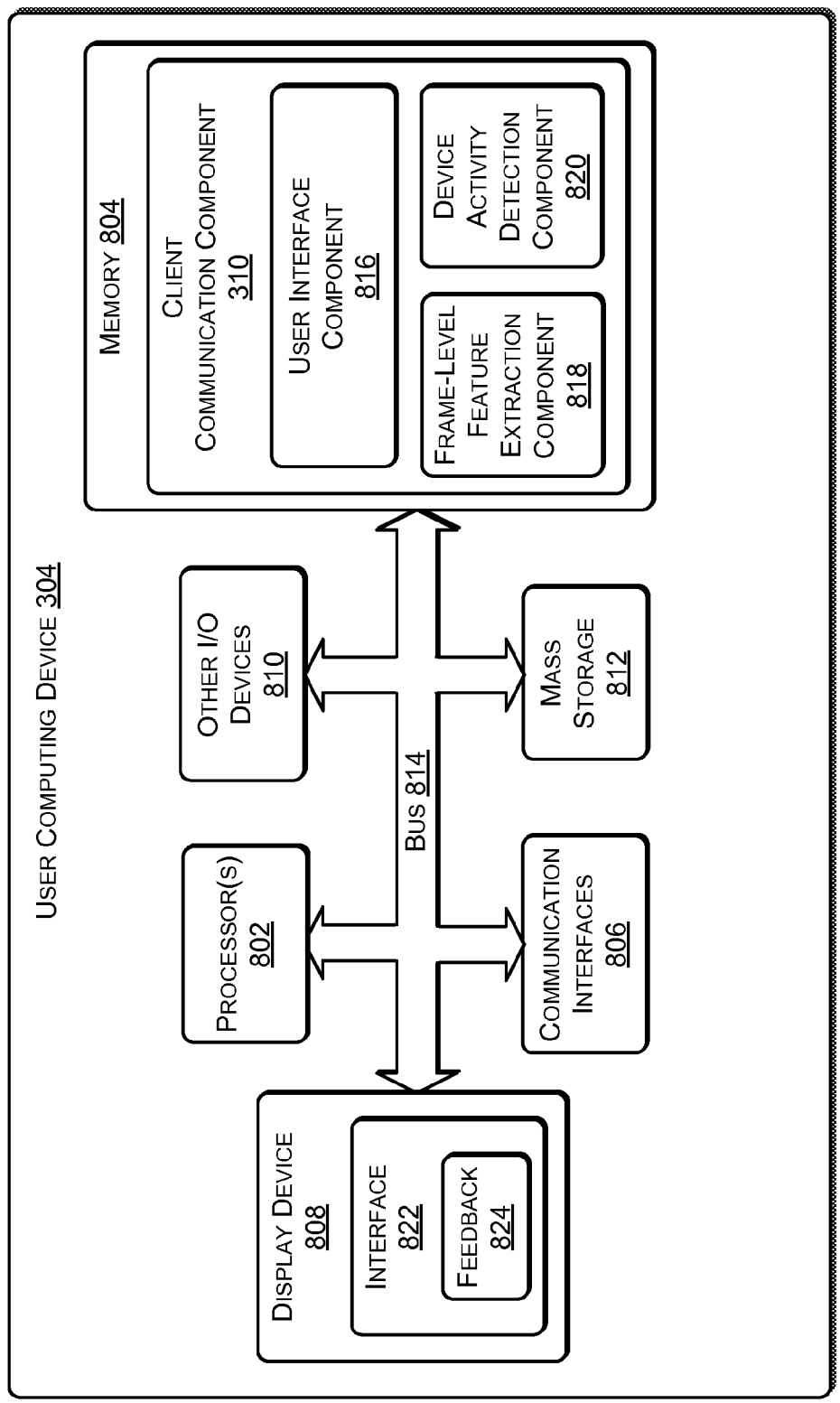
FIG. 8 depicts an example of a user computing device according to some implementations.

FIG. 8 illustrates an example configuration of a user computing device 304. The user computing device 304 may include at least one processor 802, a memory 804, communication interfaces 806, a display device 808, other input/output (I/O) devices 810, and one or more mass storage devices 812, all able to communicate through a system bus 814 or other suitable connection.

The processor 802 may be a single processing unit or a number of processing units, all of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions or processor-accessible instructions stored in the memory 804, mass storage devices 812, or other computer-readable media.

Memory 804 and mass storage devices 812 are examples of computer-readable storage media for storing instructions which are executed by the processor 802 to perform the various functions described above. For example, memory 804 may generally include both volatile memory and non-volatile memory (e.g., RAM, ROM, or the like). Further, mass storage devices 812 may generally include hard disk drives, solid-state drives, removable media, including external and removable drives, memory cards, Flash memory, floppy disks, optical disks (e.g., CD, DVD), or the like. Both memory 804 and mass storage devices 812 may be collectively referred to as memory or computer-readable storage media herein. Memory 804 is capable of storing computer-readable, processor-executable program instructions as computer program code that can be executed on the processor 802 as a particular machine configured for carrying out the operations and functions described in the implementations herein. Memory 804 may include the client communication component 310 which can be executed on the processor for implementing the functions described herein. In some implementations, client communication component 310 may include a user interface component 816, a frame-level feature extraction component 818 and a device activity detection component 820. User interface component may generate and display a user interface 822, such as user interfaces 400, 600, discussed above. Further, frame-level feature extraction component 818 may extract frame-level features from the audio and video signals generated by a user during a communication, as discussed above, and the client communication component 310 can provide these frame-level features to the receiving component, rather than providing complete audio and video feeds. Additionally, device activity detection component 820 can detect other activities of the user of the computing device 304, such as mouse usage, keyboard usage, history of desktop activity, and the like and include this along with the frame-level features as communication data provided to the receiving component for analysis of non-linguistic signals.

The user computing device 800 can also include one or more communication interfaces 806 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like, including the communication link 306.

The display device 808, such as a monitor or screen, may be included in some implementations for displaying information to users. For example, display device 808 can display user interface 822, such as user interfaces 400, 600, for presenting feedback 824 according to the implementations described herein. For example, interface 822 may be generated by user interface component 816 of client communication component 310 or other software implemented in memory 804 and able to communicate with system computing device 302. Other I/O devices 810 may include the video and teleconferencing elements described in the implementations herein, such as a camera, microphone and speakers. Other I/O devices 810 may further include devices that receive various inputs from a user and provide various outputs to the user, such as a keyboard, remote controller, a mouse and so forth. Further, while an example user computing device configuration and architecture has been described, other implementations are not limited to the particular configuration and architecture described herein.

Example System Side Process

Figure 9:
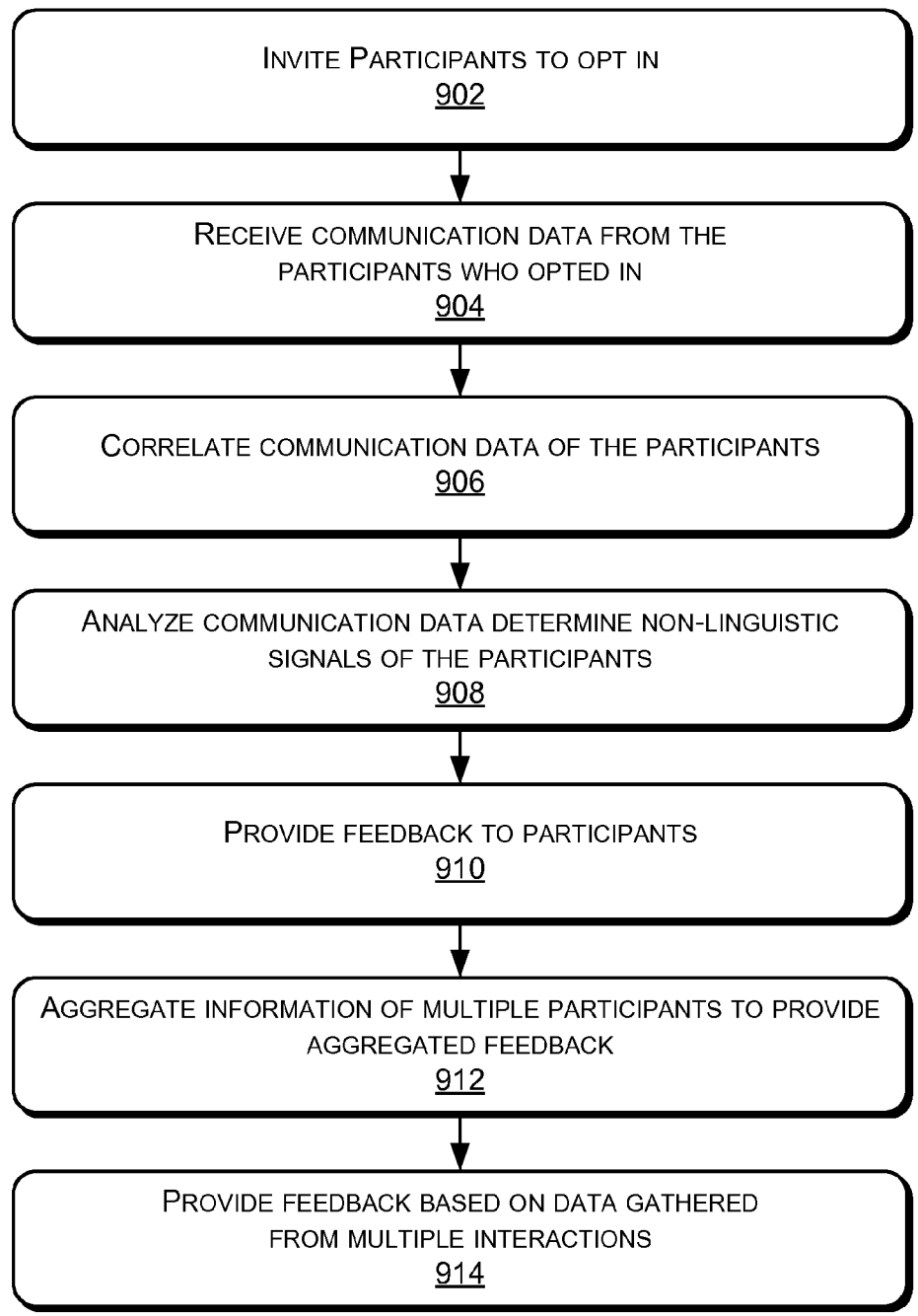
FIG. 9 depicts a flow diagram of an example process executed by a system computing device for detecting non-linguistic signals and providing feedback according to some implementations.

FIG. 9 illustrates an example of a process 900 for detecting non-linguistic signals and providing feedback that may be executed by the system computing device 302 according to some implementations herein. In the flow diagram, the operations are summarized in individual blocks. The operations may be performed in hardware, or as processor-executable instructions (software or firmware) that may be executed by one or more processors. Further, the process 900 may, but need not necessarily, be implemented using the systems, environments and interfaces of FIGS. 3-8.

At block 902, participants are invited to opt in or consent to having their non-linguistic signals determined. For those participants that consent, the system computing device will determine the non-linguistic signals of the participants.

At block 904, communication data is received from the participants who gave their consent. For example, as described above, video and/or audio communication data of the participants can be received by the system computing device to be used for determining the non-linguistic signals of the participants.

At block 906, the collected communication data is correlated for each participant. For example, the raw audio and video data for each participant is received and provided to the analysis component, which correlates and synchronizes the raw communication data for each particular participant who gave consent.

At block 908, the correlated communication data is analyzed to determine one or more non-linguistic signals of each of the participants. For example, as described above, statistical modeling, classification and analysis of an number of different features of the communication data is employed for determining one or more estimated non-linguistic signals that are most probable for the participant based on the collected communication data.

At block 910, feedback may be provided in real-time to the participants in a number of different ways. For example, as described above, each individual participant may be provided with feedback regarding the participant's own detected non-linguistic signals. In other implementations, when consent has been granted to share the non-linguistic signal information, a participant's non-linguistic signal information may be shared with one or more other participants. Additionally, in some implementations, a user interface of one or more participants may be adjusted as part of the feedback. Further, in some implementations, the environment of one or more of the participants may be adjusted automatically in response to the non-linguistic signals of one or more participants. For example, as described above, the lighting of the room may be brightened or dimmed, the lighting color changed, the temperature in the room may be adjusted, and so forth.

At block 912, the non-linguistic signal information multiple participants is aggregated to create an overall indication of the reactions of the multiple participants. For example, the non-linguistic signals detected for the participants may be aggregated and averaged to determine an overall reaction of multiple participants to a particular interaction. The aggregated information or individual participant non-linguistic signals may also or alternatively be provided at a later point in time, following the interaction, such as for training or coaching purposes, or the like.

At block 914, with participant consent, the non-linguistic signal information collected may be stored and used along with other accumulated non-linguistic signal information collected over time from other interactions for determining patterns and trends such as for research purposes, studying social and behavioral patterns, improving meeting techniques, optimizing meeting environments, and the like.

Example Client Side Process

Figure 10:
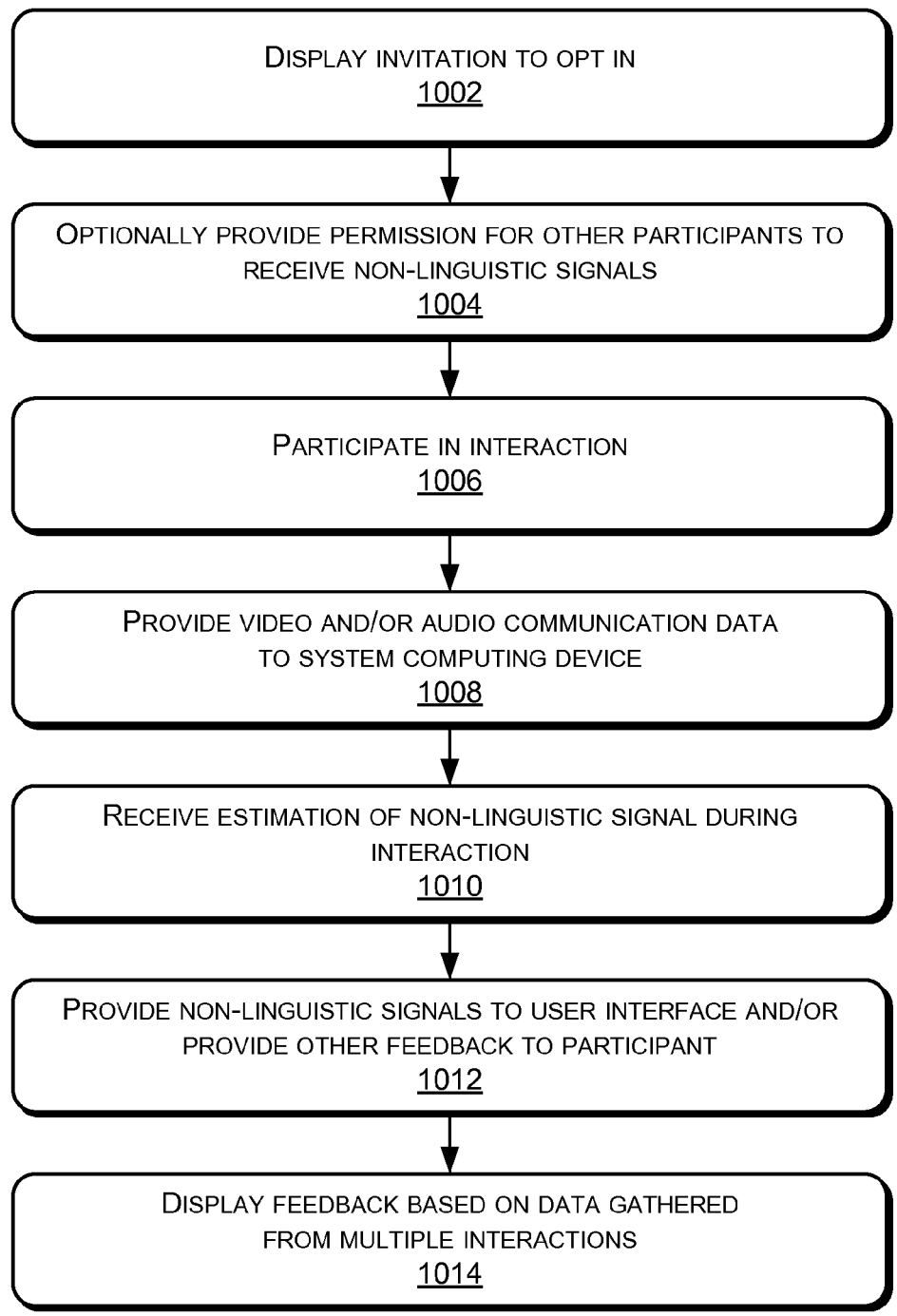
FIG. 10 depicts a flow diagram of an example process executed by a user computing device for detecting non-linguistic signals and providing feedback according to some implementations.

FIG. 10 illustrates an example of a process 1000 for detecting non-linguistic signals and providing feedback that may be executed by a user computing device 304 according to some implementations herein. In the flow diagram, the operations are summarized in individual blocks. The operations may be performed in hardware, or as processor-executable instructions (software or firmware) that may be executed by one or more processors. Further, the process 1000 may, but need not necessarily, be implemented using the systems, environments and interfaces of FIGS. 3-8.

At block 1002, an invitation for a participant to opt in or consent to having their non-linguistic signals determined may be displayed to the participant. If the participant consents, communication data of the participant will be provided to the system computing device.

At block 1004, the participant may also be provided with an option to share his or her non-linguistic signals with one or more of the other participants. For example, a participant may specify one or more other participants to receive the non-linguistic signal information, and/or the participant may consent to having the system store the non-linguistic signal information, either anonymously or not, such as for carrying out analytics.

At block 1006, the user computing device is used to participate in the interaction, such as a telecommunication session, video conference, teleconference, or other communication. As the participant participates in the interaction, audio and/or video of the participant is captured by the user computing device as communication data of the participant.

At block 1008, the communication data for the participant is provided to the system computing device. For example, in some implementations, the client communication component on the user computing device may provide frame-level features of raw audio and video data of the participant at a per-frame level to the system computing device. The communication data may also include other activity information, such as a mouse activity, keyboard activity, desktop history, and the like. Additionally, in other implementations, the full video and audio feeds may be provided to the system computing device as part of the communication data.

At block 1010, feedback may be received by the user computing device in real time or near real time for providing determined estimations of non-linguistic signals to the participant. For example, as described above, each individual participant may be provided with feedback regarding the participant's own non-linguistic signals. Additionally, when consent has been granted by other participants to share their non-linguistic signal information, the other participants' non-linguistic signal information may also be received by the user computing device as part of the feedback.

At block 1012, the participant's non-linguistic signal information and/or the non-linguistic signals of other participants is displayed to the participant, such as in a user interface. Additionally, other feedback may also be provided to the participant by the user computing device, such as modifying the user interface, as described above, modifying an environment of the participant, or the like.

At block 1014, the user computing device may also provide the participant with historical non-linguistic signal information collected from multiple interactions. The historical non-linguistic signal information may be from just the participant, from other participants, or may include aggregated information from a plurality of other participants. The information may be used for coaching or training, for detecting patterns and trends, and the like.

Machine Learning Process

Figure 11:
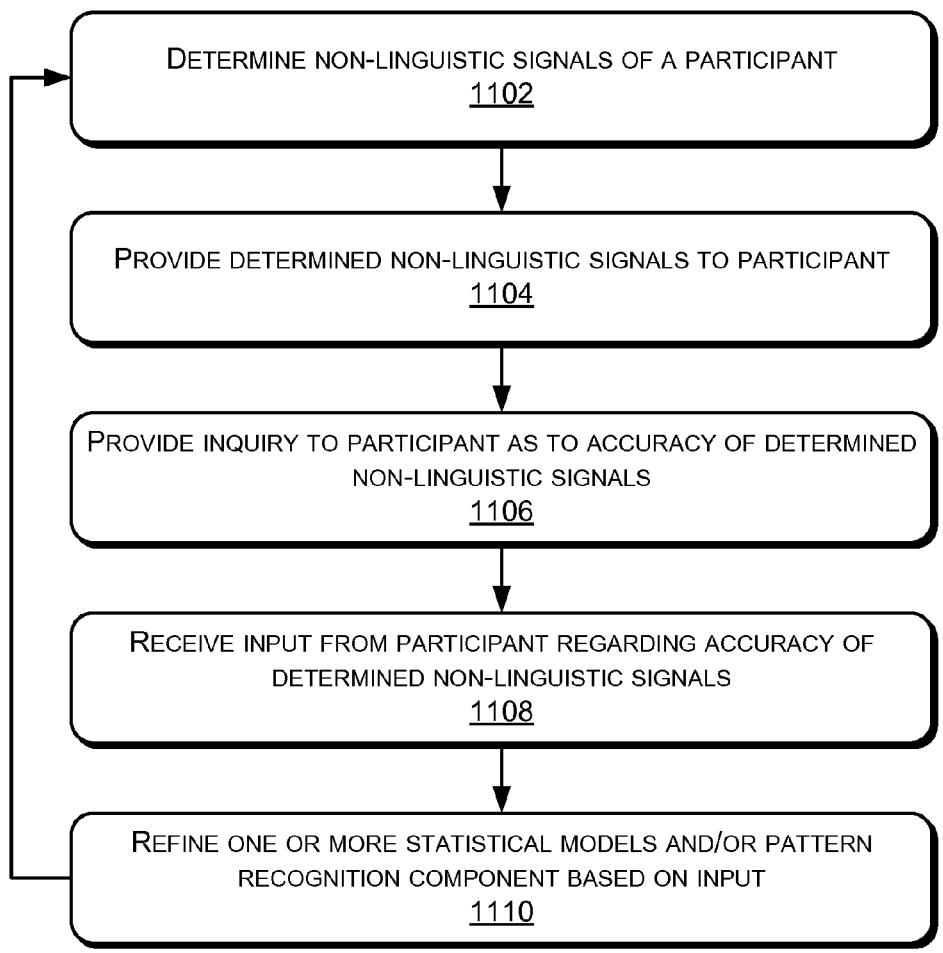
FIG. 11 depicts a flow diagram of an example process for refining the statistical models and/or pattern recognition component according to some implementations.

FIG. 11 illustrates an example of a process 1100 for refining one or more statistical models and/or the pattern recognition component according to some implementations herein. In the flow diagram, the operations are summarized in individual blocks. The operations may be performed in hardware, or as processor-executable instructions (software or firmware) that may be executed by one or more processors.

At block 1102, non-linguistic signals are determined for a participant in the manner described above.

At block 1104, the determined non-linguistic signals of the participant are provided to the participant in a user interface, such as user interfaces 400, 600, described above. This may be performed either during the communication session or at a later point in time. For example, after the communication session, the participant may view a video of the communication session, as discussed above with reference to FIG. 4B. At each point in the video, the participant can be presented with any non-linguistic signals inferred for the participant during that portion of the communication session. In some implementations, the user interface may list a plurality of non-linguistic signals that were determined for the participant during a particular telecommunication session. Thus, the user interface may list the high-level features inferred for the participant, the time at which the high-level features were detected, and so forth.

At block 1106, the system may also inquire as to the accuracy of the inferred high-level features and non-linguistic signals. For example, as described above with reference to FIG. 4B, the interface may include a question box next to each listed high-level feature to enable the participant to indicate their own perceptions as to the accuracy of each high-level feature inferred during the telecommunications session. In some implementations, the system may allow the user to just select a "yes" or "no" response, while in other implementations, the participant may be provided with a scale of responses, e.g., "very accurate", "somewhat accurate", "somewhat inaccurate", or "very inaccurate". Further in yet other implementations, the participant may select an alternative emotion or non-linguistic signal from a drop-down menu. Additionally, in other implementations, rather than providing a list of the detected non-linguistic signals, the interface may instead ask the participant one or more conversational questions based on the determined non-linguistic signals, such as "It appears that you dominated the conversation, do you agree?" or "It seems that you were not interested in the conversation. Were you?", etc. Depending on the responses of the participant, the system may provide additional questions to attempt to determine the accuracy of the interpreted non-linguistic signals of the participant.

At block 1108, if the participant chooses to respond to the questions, the input from the participant regarding the accuracy of the inferred non-linguistic signals is received by the system. For example, the input may be received by the receiving component 312 and provided to the machine learning component 372 of the analysis component 314.

At block 1110, the input from the participant may be used to refine one or more statistical models and/or pattern recognition component used for estimating participants' non-linguistic signals and participants' social roles during telecommunication sessions. In some implementations, machine learning component 372 may refine one or more of the pattern recognition component 366, the statistical models for identifying non-linguistic signals 368, the higher-level role identification component 370, or the other components 336-364 of the analysis component 314 that rely of the accuracy of statistical models and pattern recognition. The machine learning process of FIG. 11 may be an ongoing process so that as the system is used, the system learns to more accurately interpret the non-linguistic signals of the particular participant, and those of other participants as well.

Example Environments

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or applications, and may be implemented in general purpose and special-purpose computing systems, or other devices having processing capability.

Additionally, the components and systems herein can be employed in many different environments and situations, and are not limited to use in a meeting or conference room. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 7 as being stored in memory 704 of system computing device 302, system communication component 308, or portions thereof, may be implemented using any form of computer-readable media that is accessible by system computing device 302. Computer-readable media may include, for example, computer storage media and communication media. Computer storage media is configured to store data on a non-transitory tangible medium, while communications media is not.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Implementations herein use audio and/or video communications of one or more participants to detect non-linguistic signals attributable to the one or more participants. The non-linguistic signals may be provided as feedback to participants, such as for enabling participants to adjust their own behavior or be made aware of a reaction of other participants Implementations also provide pattern recognition and analysis of non-linguistic signal information at a latter point in time. The participants can be provided with complete control over their personal information and can choose how much of their non-linguistic signal information to share with others.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
receiving audio data of a participant to a telecommunication session, the telecommunication session including a plurality of participants in communication through a network;
using, by a processor, pattern recognition to determine at least one non-linguistic signal for the participant based on the received audio data, the at least one non-linguistic signal being representative of a behavior of the participant during the telecommunication session; and
providing information on the at least one non-linguistic signal as feedback to the participant during the telecommunication session to provide the participant an indication of the behavior and providing information on a plurality of non-linguistic signals for the participant collected across multiple interactions of the participant.

2. The method according to claim 1, wherein:
the participant is a first participant of the plurality of participants; and
a second participant of the plurality of participants also receives as feedback during the telecommunication session the information on the at least one non-linguistic signal of the first participant.

3. The method according to claim 1, further comprising providing to the participant the information on the at least one non-linguistic signal and information on other non-linguistic signals determined for the participant from multiple telecommunication sessions other than the telecommunication session in which the participant has taken part over time for identifying one or more patterns of behavior of the participant.

4. The method according to claim 1, further comprising:
receiving audio data for the plurality of participants;
determining at least one non-linguistic signal for individual participants of the plurality of participants based on the received audio data, the at least one non-linguistic signal being representative of a behavior of a corresponding participant during the telecommunication session; and
providing the at least one non-linguistic signal as feedback to the corresponding participant during the telecommunication session to provide an indication of his or her behavior.

5. The method according to claim 1, wherein the feedback identifies a behavior of the participant and provides information based on the identified behavior for improving communication, and the feedback includes an inquiry as to the accuracy of the behavior identified, the method further comprising:
receiving from the participant an indication as to the accuracy of the behavior identified; and
refining at least one of a statistical model or a pattern recognition component used to identify the behavior based on the indication received from the participant.

6. A system comprising:
one or more processors in communication with one or more computer-readable storage media;
a receiving component, maintained on the one or more computer-readable storage media and executed by the one or more processors, to receive communication data of one or more participants to an interaction, wherein the communication data includes audio data;
an analysis component to identify one or more non-linguistic signals of the one or more participants based at least in part on the audio data; and
a feedback component to determine feedback based on the one or more non-linguistic signals and based on a plurality of non-linguistic signals collected across multiple interactions of the one or more participants.

7. The system according to claim 6, wherein the communication data for a particular participant includes at least one of audio data from a microphone in proximity to the particular participant or video data from a video camera directed at the particular participant.

8. The system according to claim 6, the analysis component comprising at least one component for analyzing the audio data, comprising at least one of: a speaking percentage component, a syllabic rate component, a speech spectrum component, a pitch variation component, a barge-in rate component, a grant-floor rate component, or an interruption suppression rate component.

9. The system according to claim 6, wherein the communication data further includes video data, and wherein the analysis component analyzes the video data, the analysis component comprising at least one of a headshake detection component or an eye tracking component.

10. The system according to claim 6, wherein:
the receiving component, the analysis component and a feedback component are implemented on a system computing device;
the system computing device is in communication with a plurality of user computing devices via a network; and
the receiving component receives the communication data for a particular participant from a particular user computing device used by the particular participant to communicate with other participants during a telecommunication session.

11. The system according to claim 10, wherein:
the feedback component provides feedback to the particular user computing device from which the communication data for the particular participant was received; and
the feedback comprises at least one non-linguistic signal interpreted from the communication data received from the particular user computing device.

12. The system according to claim 6, wherein the one or more non-linguistic signals are based on at least one of influence, consistency, or activity.

13. The system according to claim 6, further comprising a feedback component to provide feedback based on the one or more non-linguistic signals, wherein the feedback includes providing a visualization of at least one of influence, consistency, activity, or speaking percentage to be displayed on a user interface presented to at least one participant.

14. The system according to claim 6, further comprising a feedback component to provide feedback based on the one or more non-linguistic signals, wherein the feedback includes an estimate of a higher-level role of one or more of the participants.

15. The system according to claim 6, wherein:
the interaction includes a telecommunication session;
at least some of the one or more participants are located in a meeting room having a telecommunication system; and
communication data for the participants in the meeting room is correlated to particular participants based on at least one of facial recognition or locations of the participants relative to a plurality of microphones in the meeting room.

16. A method comprising:
transmitting communication data to a system computing device, the communication data corresponding to a participant participating in a telecommunication session, wherein the communication data includes audio data;
receiving information from the system computing device, the information based on one or more non-linguistic signals of the participant participating in the telecommunication session and based on a plurality of non-linguistic signals of the participant collected across multiple interactions, wherein a processor identifies one or more behavior patterns of the participant based on the information; and
displaying a user interface that includes feedback relating to the information.

17. The method according to claim 16, wherein the feedback further comprises information relating to at least one other non-linguistic signal corresponding to at least one other participant to the telecommunication session, the displaying further comprising displaying in the user interface the information relating to the at least one other non-linguistic signal.

18. The method according to claim 16, the displaying further comprising displaying information relating to an aggregation of non-linguistic signals for a plurality of participants to the telecommunication session to provide an indication of an overall reaction of the plurality of participants.

19. The method according to claim 16, further comprising adjusting an environment of a room in which the participant is present in response to the received feedback.

20. The system according to claim 16, wherein the audio data is associated with a microphone and the one or more behavior patterns of the participant comprises a barge-in rate.

* * * * *